(12) United States Patent
Ichinohashi

(10) Patent No.: US 12,002,999 B2
(45) Date of Patent: Jun. 4, 2024

(54) ENERGY STORAGE DEVICE

(71) Applicant: GS Yuasa International Ltd., Kyoto (JP)

(72) Inventor: Hironori Ichinohashi, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 524 days.

(21) Appl. No.: 17/287,078

(22) PCT Filed: Oct. 23, 2019

(86) PCT No.: PCT/JP2019/041452
§ 371 (c)(1),
(2) Date: Apr. 20, 2021

(87) PCT Pub. No.: WO2020/085357
PCT Pub. Date: Apr. 30, 2020

(65) Prior Publication Data
US 2021/0359378 A1    Nov. 18, 2021

(30) Foreign Application Priority Data

Oct. 26, 2018   (JP) ................................. 2018-201963

(51) Int. Cl.
*H01M 50/00*        (2021.01)
*H01M 10/0525*      (2010.01)
(Continued)

(52) U.S. Cl.
CPC ..... *H01M 50/545* (2021.01); *H01M 10/0525* (2013.01); *H01M 50/533* (2021.01);
(Continued)

(58) Field of Classification Search
CPC ........... H01M 50/531; H01M 10/0525; H01M 50/545
See application file for complete search history.

(56) References Cited

U.S. PATENT DOCUMENTS

2014/0030586 A1\* 1/2014 Tononishi ........... H01M 50/528
429/178
2018/0040918 A1   2/2018 Guen
(Continued)

FOREIGN PATENT DOCUMENTS

JP    2013-114816 A    6/2013
JP    2014-067532 A    4/2014
(Continued)

OTHER PUBLICATIONS

Hori et al., Aug. 2018, Square Secondary Battery, See the Abstract. (Year: 2018).\*
(Continued)

*Primary Examiner* — Cynthia H Kelly
*Assistant Examiner* — Monique M Wills
(74) *Attorney, Agent, or Firm* — MCGINN I.P. LAW GROUP, PLLC

(57) ABSTRACT

An energy storage device includes a case, an electrode assembly housed in the case, a current collector arranged between the electrode assembly and a lid of the case in Z-axis direction, and an electrode terminal fixed to the lid. The current collector has a terminal connecting portion connected to the electrode terminal and an electrode connecting portion connected to the electrode assembly. The terminal connecting portion and the electrode connecting portion are arranged side by side in X-axis direction intersecting with the Z-axis direction, and a thickness of the electrode connecting portion is smaller than a thickness of the terminal connecting portion.

15 Claims, 6 Drawing Sheets

(51) Int. Cl.
*H01M 50/533* (2021.01)
*H01M 50/534* (2021.01)
*H01M 50/545* (2021.01)
*H01M 50/531* (2021.01)
*H01M 50/536* (2021.01)

(52) U.S. Cl.
CPC ........ *H01M 50/534* (2021.01); *H01M 50/531* (2021.01); *H01M 50/536* (2021.01); *H01M 2220/20* (2013.01)

(56) References Cited

U.S. PATENT DOCUMENTS

| | | | |
|---|---|---|---|
| 2018/0062152 A1* | 3/2018 | Yoshida | H01M 50/533 |
| 2018/0123110 A1 | 5/2018 | Hirose et al. | |
| 2018/0272456 A1* | 9/2018 | Kobayashi | H01M 4/661 |
| 2019/0044103 A1 | 2/2019 | Ogawa et al. | |

FOREIGN PATENT DOCUMENTS

| | | | | |
|---|---|---|---|---|
| JP | 2014-107146 A | | 6/2014 | |
| JP | JP WO2016/152372 A1 | | 9/2016 | |
| JP | 2017-059509 A | | 3/2017 | |
| JP | 2017-084540 A | | 5/2017 | |
| JP | 2018137192 A | * | 8/2018 | |
| WO | WO-2016185867 A1 | * | 11/2016 | .......... H01M 10/049 |

OTHER PUBLICATIONS

Egawa et al., Nov. 2016, Rectangular Secondary Battery, See the Abstract. (Year: 2016).*
International Search Report (ISR) (PCT Form PCT/ISA/210), in PCT/JP2019/041452, dated Jan. 21, 2020.

* cited by examiner ents when the energy storage device according to the
ENERGY STORAGE DEVICE

TECHNICAL FIELD

The present invention relates to an energy storage device including a case and an electrode assembly housed in the case.

BACKGROUND ART

Patent Document 1 discloses an energy storage apparatus including a case and an electrode assembly body housed in the case. In this energy storage apparatus, a tab group of the electrode assembly body and a conductive member fixed to a lid member of the case are connected. The conductive member includes a fixed piece fixed to an inner surface of the lid member and a connecting piece that intersects with the fixed piece and projects toward the electrode assembly body. The tab group is connected to the connecting piece by welding, after which the connecting piece is bent. That is, the tab and the connecting piece are folded, and in that state, the electrode assembly body is housed in the case.

PRIOR ART DOCUMENT

Patent Document

Patent Document 1: WO 2016/152372 A1

SUMMARY OF THE INVENTION

Problems to be Solved by the Invention

In an energy storage device including a case and an electrode assembly housed in the case, when a current collector fixed to the wall of the case is connected to the electrode assembly by welding or the like, a space for housing a connection part between the current collector and the electrode assembly is required between the electrode assembly and the wall. This causes pressure on the housing space for the electrode assembly in the case. As a result, it becomes difficult to improve the energy density of the energy storage device. This problem is particularly remarkable when the portion of the current collector (conductive member in Patent Document 1) connected to the electrode assembly is folded and arranged inside the case as in the conventional energy storage apparatus.

An object of the present invention is to provide an energy storage device capable of improving the energy density in consideration of the above problems.

Means for Solving the Problems

An energy storage device according to one aspect of the present invention is an energy storage device including a case and an electrode assembly housed in the case, the energy storage device including a current collector arranged between the electrode assembly and a wall of the case in a first direction, and an electrode terminal fixed to the wall, in which the current collector has a terminal connecting portion connected to the electrode terminal, and an electrode connecting portion connected to the electrode assembly, the terminal connecting portion and the electrode connecting portion are arranged side by side in a second direction intersecting with the first direction, and a thickness of the electrode connecting portion is smaller than a thickness of the terminal connecting portion.

Advantages of the Invention

According to the energy storage device according to the present invention, the energy density can be improved.

MODE FOR CARRYING OUT THE INVENTION

Figure 1:
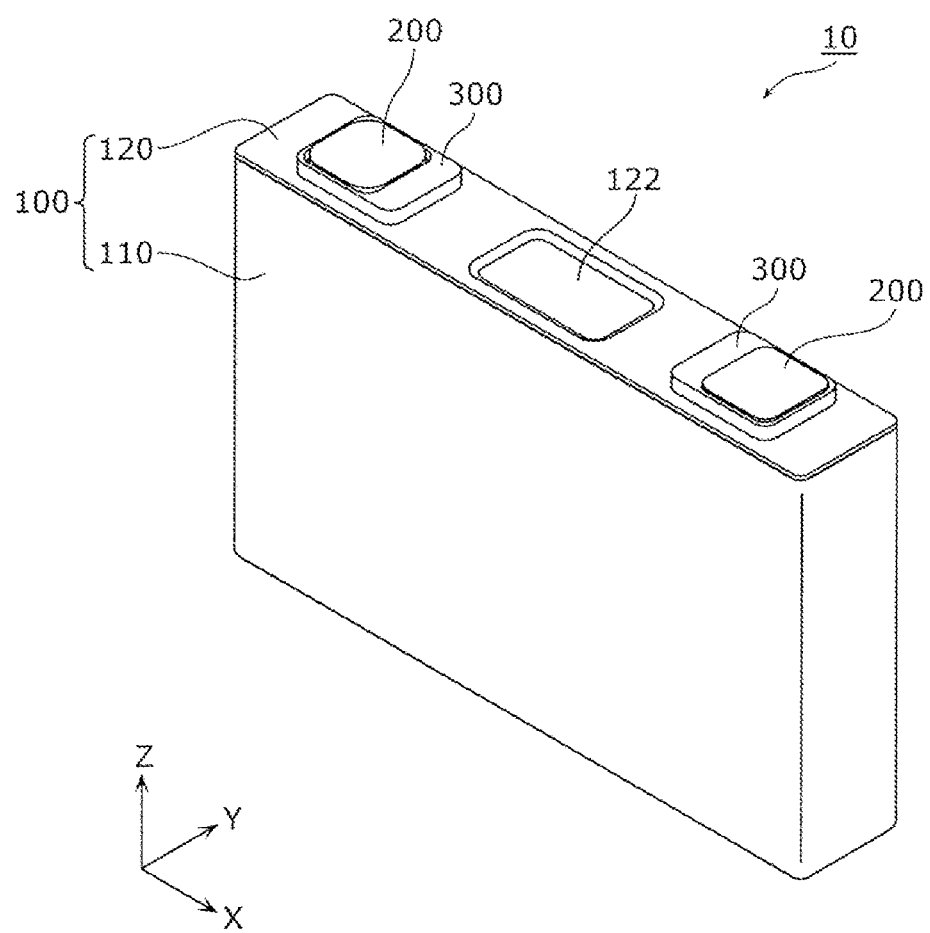
FIG. 1 is a perspective view showing an external appearance of an energy storage device according to an embodiment.

An energy storage device according to one aspect of the present invention is an energy storage device including a case and an electrode assembly housed in the case, the energy storage device including a current collector arranged between the electrode assembly and a wall of the case in a first direction, and an electrode terminal fixed to the wall, in which the current collector has a terminal connecting portion connected to the electrode terminal, and an electrode connecting portion connected to the electrode assembly, the terminal connecting portion and the electrode connecting portion are arranged side by side in a second direction intersecting with the first direction, and a thickness of the electrode connecting portion is smaller than a thickness of the terminal connecting portion.

According to this configuration, since the electrode connecting portion is formed thinner than the terminal connecting portion, for example, a tab portion of the electrode assembly joined to the electrode connecting portion can be arranged at a position closer to the wall of the case. That is, in the energy storage device of this aspect, the relatively thick terminal connecting portion can suppress the deformation of the connection portion with the electrode terminal in the current collector. The relatively thin electrode connecting portion can improve the volume occupancy of the electrode assembly in the case. Therefore, according to the energy storage device according to this aspect, the energy density can be improved.

The width of the electrode connecting portion in the third direction intersecting with the first direction and the second direction may be larger than the width of the terminal connecting portion in the third direction.

According to this configuration, in the conduction path formed in the current collector along the second direction, the cross-sectional area of the electrode connecting portion is suppressed to be smaller than the cross-sectional area of the terminal connecting portion. As a result, for example, even when the electrode connecting portion is formed to be relatively thin in order to improve the energy density, the possibility that the electrode connecting portion interferes with the conduction during charge-discharge of the energy storage device is reduced.

The area of the cross section of the electrode connecting portion orthogonal to the second direction may be equal to or larger than the area of the cross section of the terminal connecting portion orthogonal to the second direction.

According to this configuration, the resistance value of the electrode connecting portion in the conduction path in the energy storage device 10 is equal to or less than the resistance value of the terminal connecting portion. The fusing resistance of the electrode connecting portion is equal to or higher than the fusing resistance of the terminal connecting portion. Thereby, for example, the reliability of the energy storage device having improved energy density can be improved.

The current collector further has an intermediate portion that connects the terminal connecting portion and the electrode connecting portion, and the intermediate portion may be formed to be smaller in thickness and larger in width in the third direction as it approaches from the terminal connecting portion to the electrode connecting portion.

According to this configuration, in the portion where the terminal connecting portion and the electrode connecting portion are connected, a portion for changing the cross-sectional shape is provided so that the cross-sectional area becomes substantially constant. As a result, a portion where the cross-sectional area suddenly decreases is not formed at the boundary between the terminal connecting portion and the electrode connecting portion. Therefore, problems such as a decrease in the charge-discharge efficiency are unlikely to occur. This contributes to, for example, improving the reliability of the energy storage device having improved energy density.

The end portion of the electrode connecting portion in the third direction intersecting with the first direction and the second direction may be bent toward the electrode assembly.

According to this configuration, the electrode connecting portion has a bent end portion to suppress a decrease in cross-sectional area due to being relatively thin, and the width in the third direction can be about the same as that of the terminal connecting portion. Therefore, for example, an existing gasket can be used as a gasket to be arranged between the current collector and the wall. As a result, for example, the manufacturing cost of the energy storage device having improved energy density is suppressed.

The surface of the current collector facing the wall is flat, and a step may be formed on a surface of the current collector facing the electrode assembly due to difference in thickness between the terminal connecting portion and the electrode connecting portion.

According to this configuration, almost all of the space obtained by thinning the electrode connecting portion can be used as a space for housing the electrode assembly. That is, the effect of improving the energy density is maximized by making the electrode connecting portion thinner.

The present invention can be realized not only as such an energy storage device, but also as the current collector included in the energy storage device.

Hereinafter, an energy storage device according to an embodiment (and a modification example thereof) of the present invention is described with reference to the drawings. Each of the embodiments described below provides a comprehensive or specific example. However, numerical values, shapes, materials, components, arrangement positions and connection modes of the components, manufacturing steps, order of manufacturing steps, and the like described in the following embodiments are only examples and are not intended to limit the present invention. In each drawing, dimensions and the like are not strictly shown.

In the following description and drawings, an arrangement direction of a pair of electrode terminals (positive electrode side and negative electrode side) of the energy storage device, an arrangement direction of a pair of current collectors, an arrangement direction of a pair of tab portions of the electrode assembly, an arrangement direction of a pair of spacers, or a direction opposite to a short side surface of the case is defined as the X-axis direction. The direction opposite to a long side surface of the case, a short side direction of a short side surface of the case, or a thickness direction of the case is defined as the Y-axis direction. An arrangement direction of the electrode terminal, the current collector, and the electrode assembly, an arrangement direction of a case body and a lid of the energy storage device, a longitudinal direction of the short side surface of the case, a winding axis direction of the electrode assembly, an extending direction of the spacer, or the vertical direction is defined as the Z-axis direction. These X-axis direction, Y-axis direction, and Z-axis direction are directions that intersect with each other (orthogonal in the present embodiment). Although the Z-axis direction may not be in the vertical direction depending on the usage mode, the Z-axis direction will be described below as the vertical direction for convenience of explanation. In the following description, for example, an X-axis plus direction indicates an arrow direction of the X-axis, and an X-axis minus direction indicates a direction opposite to the X-axis plus direction. The same applies to the Y-axis direction and the Z-axis direction.

Embodiment

[1. General Description of Energy Storage Device]

Figure 2:
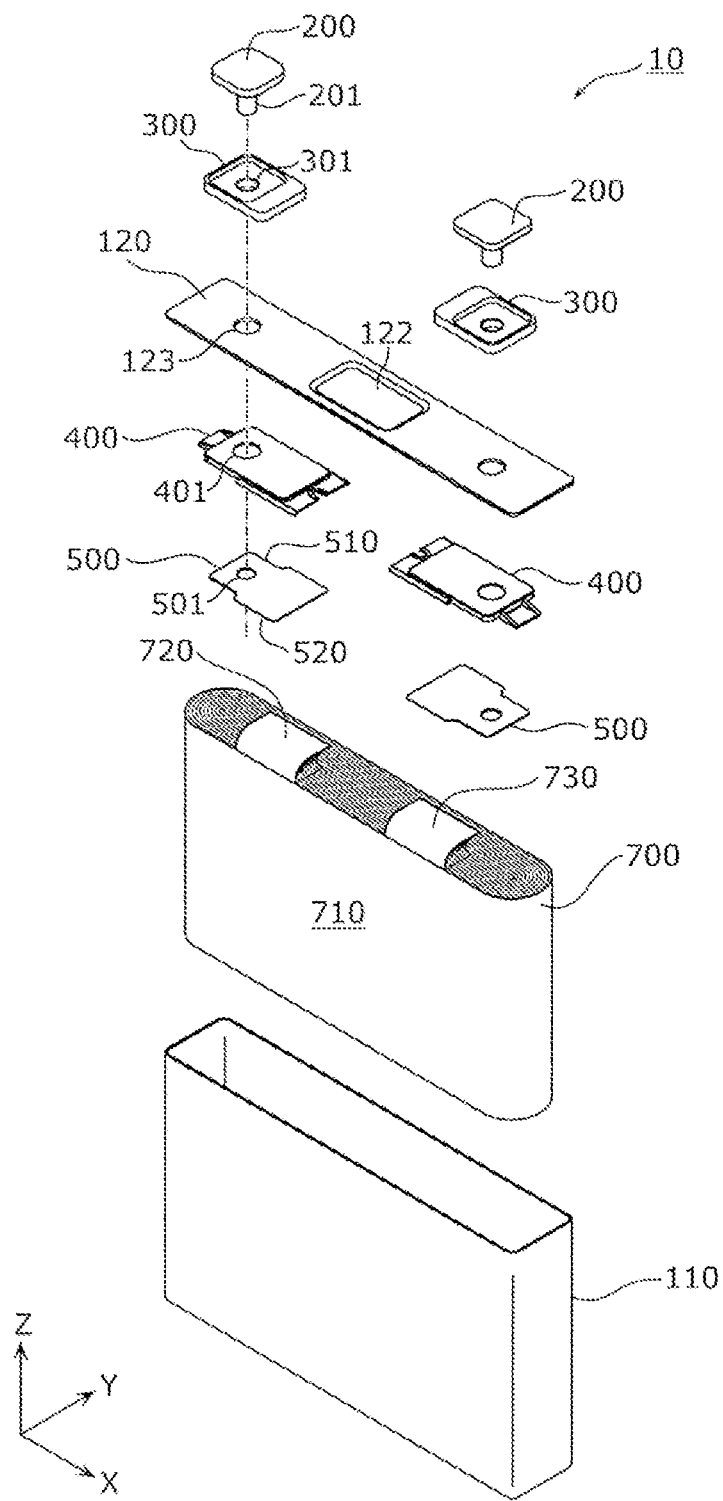
FIG. 2 is an exploded perspective view showing components when the energy storage device according to the embodiment is disassembled.

First, a general description of an energy storage device 10 according to the present embodiment will be described with reference to FIGS. 1 and 2. FIG. 1 is a perspective view showing an external appearance of the energy storage device 10 according to the embodiment. FIG. 2 is an exploded perspective view showing components when the energy storage device 10 according to the embodiment is disassembled.

The energy storage device 10 is a secondary battery which can charge electricity or discharge electricity, more specifically, is a nonaqueous electrolyte secondary battery such as a lithium ion secondary battery. The energy storage device 10 is used as a battery or the like for driving or starting engine of a moving body, such as an automobile such as an electric vehicle (EV), a hybrid electric vehicle (HEV), or a plug-in hybrid electric vehicle (PHEV), a motorcycle, a watercraft, a snowmobile, an agricultural machine, or a construction machine, or railway vehicle for an electric railway such as a train, a monorail, or a linear motor car.

The energy storage device 10 is not limited to a nonaqueous electrolyte secondary battery, and may be a secondary battery other than the nonaqueous electrolyte secondary battery or may be a capacitor. The energy storage device 10 may not be a secondary battery but may be a primary battery that can use electricity which is stored without the user having to charge the battery. The energy storage device 10 may be a laminated type energy storage device. In the present embodiment, the rectangular parallelepiped shape (square) energy storage device 10 is illustrated, but the shape of the energy storage device 10 is not limited to the rectangular parallelepiped shape, and may be a polygonal column shape, a cylinder shape, a long cylinder shape or the like other than the rectangular parallelepiped shape.

As shown in FIG. 1, the energy storage device 10 includes a case 100, a pair of electrode terminals 200 (positive electrode side and negative electrode side), and a pair of upper gaskets 300 (positive electrode side and negative electrode side). As shown in FIG. 2, a pair of lower gaskets 400 (positive electrode side and negative electrode side), a pair of current collectors 500 (positive electrode side and negative electrode side), and an electrode assembly 700 are housed inside the case 100. An electrolyte solution (non-aqueous electrolyte) is sealed inside the case 100, but the illustration is omitted. The electrolyte solution is not particularly limited in type as long as it does not impair the performance of the energy storage device 10, and various electrolyte solutions can be selected. In addition to the above components, a spacer arranged above or on the side of the electrode assembly 700, an insulating film wrapping the electrode assembly 700 or the like, and the like may be arranged.

The case 100 is a rectangular parallelepiped (box-shaped) case having a case body 110 having an opening formed therein and a lid 120 closing the opening of the case body 110. With such a configuration, the case 100 has a structure in which the inside of the case 100 can be sealed by housing the electrode assembly 700 or the like inside the case body 110 and then connecting the case body 110 and the lid 120 by welding or the like. The material of the case body 110 and the lid 120 is not particularly limited, but is preferably a weldable metal such as stainless steel, aluminum, an aluminum alloy, iron, and plated steel plate.

The case body 110 is a rectangular tubular member having a bottom that constitutes the body portion of the case 100, and has an opening formed on the Z-axis plus direction side. The lid 120 is a plate-shaped member long and rectangular in the X-axis direction that constitutes the lid of the case 100, and is arranged at a position that closes the opening of the case body 110. The lid 120 is provided with a gas release valve 122 that discharges the gas inside the case 100 when the internal pressure of the case 100 rises excessively.

The electrode assembly 700 includes a positive electrode plate, a negative electrode plate, and a separator, and is an energy storage element (power generating element) capable of storing electricity. Specifically, the electrode assembly 700 is formed by winding what is arranged in layers so that a separator is sandwiched between the positive electrode plate and the negative electrode plate. As a result, a plurality of tabs on the positive electrode plate are laminated to form a tab portion 720 on the positive electrode side, and a plurality of tabs on the negative electrode plate are laminated to form a tab portion 730 on the negative electrode side. That is, the electrode assembly 700 has an electrode assembly body portion 710 and the tab portions 720 and 730 protruding from a part of the electrode assembly body portion 710 in the Z axis plus direction and extending in the Y axis plus direction. In the present embodiment, the electrode assembly 700 having an oval cross-sectional shape is adopted, but the cross-sectional shape of the electrode assembly 700 may be an elliptical shape or the like.

The electrode terminal 200 is an electrode terminal electrically connected to the electrode assembly 700 via the current collector 500. The electrode terminal 200 is connected to the current collector 500 by swaging or the like, and is attached to the lid 120. Specifically, the electrode terminal 200 has a shaft portion 201 (rivet portion) extending downward (Z-axis minus direction). Then, the shaft portion 201 is inserted through a through hole 301 of the upper gasket 300, a through hole 123 of the lid 120, a through hole 401 of the lower gasket 400, and a through hole 501 of the current collector 500 and swaged. As a result, the electrode terminal 200 is fixed to the lid 120 together with the upper gasket 300, the lower gasket 400, and the current collector 500. The electrode terminal 200 is formed of a conductive member such as metal such as aluminum, an aluminum alloy, copper, or a copper alloy.

The current collector 500 is a rectangular and flat plate-shaped member that electrically connects the electrode assembly 700 and the electrode terminal 200. Specifically, the current collector 500 on the positive electrode side has a terminal connecting portion 510 joined to the electrode terminal 200 on the positive electrode side by swaging or the like, and an electrode connecting portion 520 connected (joined) to the tab portion 720 on the positive electrode side of the electrode assembly 700 by welding or the like. The same applies to the current collector 500 on the negative electrode side, and the current collector 500 has the terminal connecting portion 510 joined to the electrode terminal 200 on the negative electrode side by swaging or the like, and the electrode connecting portion 520 connected (joined) to the tab portion 730 on the negative electrode side of the electrode assembly 700 by welding or the like. The current collector 500 is formed of metal such as aluminum, an aluminum alloy, copper or a copper alloy. The method for connecting (joining) the current collector 500 and the electrode terminal 200 is not limited to swaging joining, and ultrasonic bonding, welding such as laser welding, or resistance welding, or mechanical joining other than swaging such as screw fastening may be used. The method for connecting (joining) the current collector 500 and the tab portion 720 or 730 may use any welding such as ultrasonic bonding, laser welding, or resistance welding, mechanical joining such as swaging joining or screw fastening, or the like. The details of the current collector 500 will be described later with reference to FIGS. 3 to 8.

The upper gasket 300 is a flat plate-shaped insulating sealing member arranged between the lid 120 of the case 100 and the electrode terminal 200. The lower gasket 400 is a flat plate-shaped insulating sealing member arranged between the lid 120 and the current collector 500. The upper gasket 300 and the lower gasket 400 are formed of, for example, an insulating material, such as a resin such as polypropylene (PP), polyethylene (PE), polyphenylene sulfide resin (PPS), polyethylene terephthalate (PET), polyether ether ketone (PEEK), tetrafluoroethylene/perfluoroalkyl vinyl ether (PFA), polytetrafluoroethylene (PTFE), polybutylene terephthalate (PBT), or poly ether sulfone (PES), or a composite material containing these resins.

[2. Configuration of Current Collector]

Next, the configuration of the current collector 500 will be described in detail with reference to FIGS. 3 to 9. First, the basic configuration of the current collector 500 will be described with reference to FIGS. 3 to 6. In the present embodiment, since the current collector 500 on the positive electrode side and the current collector 500 on the negative electrode side have the same configuration, the current collector 500 on the positive electrode side will be focused on and described below.

Figure 3:
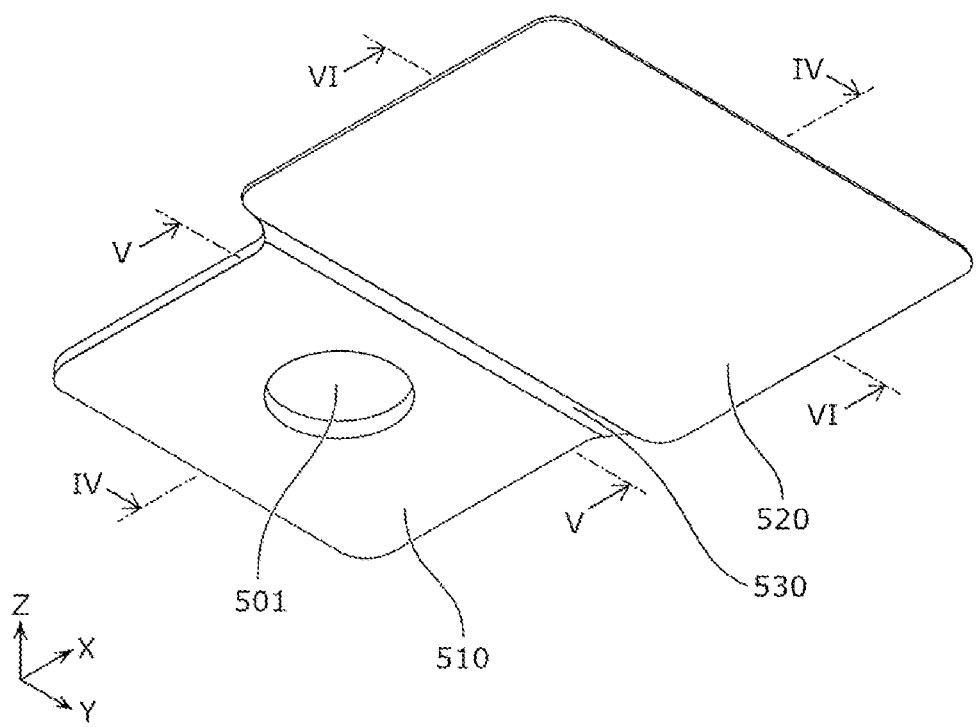
FIG. 3 is a perspective view showing an external appearance of a current collector according to the embodiment.
Figure 4:
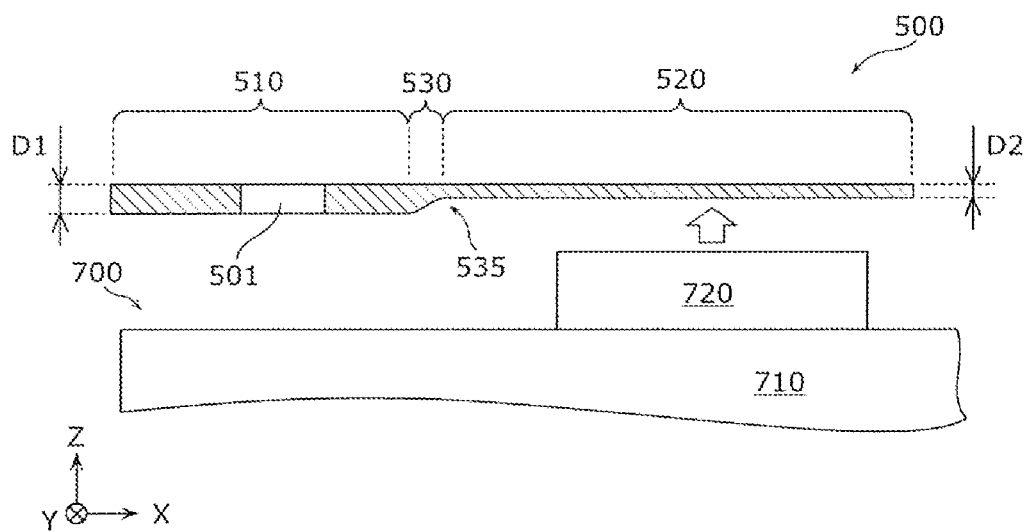
FIG. 4 is a cross-sectional view showing an IV-IV cross section of the current collector in FIG. 3.
Figure 5:
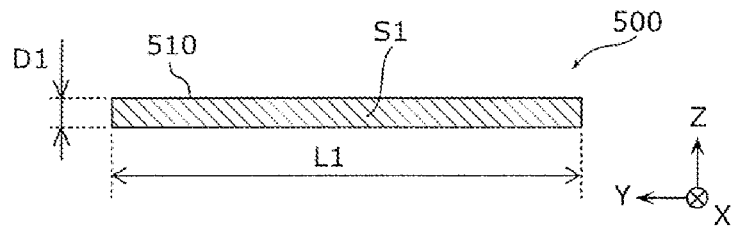
FIG. 5 is a cross-sectional view showing a V-V cross section of the current collector in FIG. 3.
Figure 6:
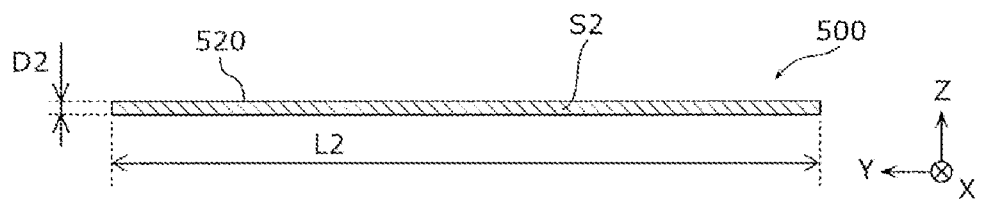
FIG. 6 is a cross-sectional view showing a VI-VI cross section of the current collector in FIG. 3.

FIG. 3 is a perspective view showing an external appearance of the current collector 500 according to the embodiment. Specifically, FIG. 3 is a perspective view of the current collector 500 on the positive electrode side when viewed from diagonally below (the side of the electrode assembly 700). FIG. 4 is a cross-sectional view showing an IV-IV cross section of the current collector 500 in FIG. 3. FIG. 5 is a cross-sectional view showing a V-V cross section of the current collector 500 in FIG. 3. FIG. 6 is a cross-sectional view showing a VI-VI cross section of the current collector 500 in FIG. 3. In FIG. 4, in addition to the cross section of the current collector 500, a side view of a part of the electrode assembly 700 is schematically shown in order to show a rough positional relationship between the electrode assembly 700 and the current collector 500.

As shown in FIGS. 3 to 6, the current collector 500 according to the present embodiment has a terminal connecting portion 510 and an electrode connecting portion 520. The terminal connecting portion 510 is formed with a through hole 501 through which the shaft portion 201 of the electrode terminal 200 penetrates. As described above, the shaft portion 201 of the electrode terminal 200 is inserted into the through hole 501, and the tip portion of the shaft portion 201 exposed from the through hole 501 is swaged. As a result, the electrode terminal 200 and the current collector 500 are mechanically and electrically connected.

The electrode connecting portion 520 is a portion to which the electrode assembly 700 is connected, and a tab portion 720 on the positive electrode side of the electrode assembly 700 is connected to the electrode connecting portion 520 of the current collector 500 on the positive electrode side, as shown in FIG. 4. For this connection, a predetermined method such as ultrasonic bonding is used as described above.

The current collector 500 having such a configuration is arranged between the electrode assembly 700 and the lid 120 (see FIG. 2) in the Z-axis direction. The terminal connecting portion 510 and the electrode connecting portion 520 are arranged side by side in the X-axis direction. The Z-axis direction is an example of the first direction, the X-axis direction is an example of the second direction intersecting with the first direction, and the lid 120 is an example of the wall of the case. Further, as shown in FIGS. 5 and 6, the electrode connecting portion 520 is formed thinner than the terminal connecting portion 510.

That is, the energy storage device 10 according to the present embodiment includes the case 100, the electrode assembly 700 housed in the case 100, the current collector 500 arranged between the electrode assembly 700 and the lid 120 of the case 100 in the Z-axis direction, and the electrode terminal 200 fixed to the lid 120. The current collector 500 has the terminal connecting portion 510 connected to the electrode terminal 200 and the electrode connecting portion 520 connected to the electrode assembly 700. The terminal connecting portion 510 and the electrode connecting portion 520 are arranged side by side in the X-axis direction intersecting with the Z-axis direction, and the thickness D2 of the electrode connecting portion 520 is smaller than the thickness D1 of the terminal connecting portion 510.

That is, when the Z-axis plus direction is upward, in the current collector 500 located above the electrode assembly 700, the portion connected to the electrode terminal 200 (terminal connecting portion 510) and the portion connected to the electrode assembly 700 (electrode connecting portion 520) are arranged in the horizontal direction (left-right direction). Therefore, for example, even when the swaged portion formed on the lower surface of the electrode connecting portion 520 protrudes relatively large from the lower surface, the swaged portion does not interfere with the electrode assembly body portion 710 and can be housed in the space on the side of the tab portion 720.

Further, in the present embodiment, since the electrode connecting portion 520 is formed thinner than the terminal connecting portion 510, for example, the tab portion 720 of the electrode assembly 700 joined to the electrode connecting portion 520 can be arranged at a position closer to the lid 120. Since the electrode connecting portion 520 is relatively thick, deformation due to a swaging force is suppressed when the shaft portion 201 of the electrode terminal 200 is swaged as described above. That is, in the energy storage device 10 according to the present embodiment, the relatively thick terminal connecting portion 510 can suppress the deformation of the connection portion with the electrode terminal 200 in the current collector 500, and the relatively thin electrode connecting portion 520 can improve the volume occupancy of the electrode assembly 700 in the case 100. Therefore, according to the energy storage device 10 according to the present embodiment, the energy density can be improved.

The thickness D1 of the terminal connecting portion 510 in the current collector 500 is, for example, about 1 mm, and the thickness D2 of the electrode connecting portion 520 is, for example, about 0.5 mm. These numerical values are examples, and if the thicknesses D1 and D2 of the terminal connecting portion 510 and the electrode connecting portion 520 respectively satisfy D1>D2, these values may be appropriately determined according to the material of the current collector 500, the storage capacity of the electrode assembly 700, the size of the case 100, or the like.

For example, as shown in FIGS. 3, 5 and 6, the width L2 of the electrode connecting portion 520 in the Y-axis direction intersecting with the Z-axis direction and the X-axis direction is larger than the width L1 of the terminal connecting portion 510 in the Y-axis direction.

According to this configuration, in the conduction path formed in the current collector 500 along the X-axis direction, the cross-sectional area of the electrode connecting portion 520 is suppressed to be smaller than the cross-sectional area of the terminal connecting portion 510. Simply put, the decrease in cross-sectional area due to the thinning of the electrode connecting portion 520 can be compensated for by increasing the width of the electrode connecting portion 520. As a result, for example, even when the electrode connecting portion 520 is formed to be relatively thin in order to improve the energy density, the possibility that the electrode connecting portion 520 may hinder the conduction of the energy storage device 10 during the charge-discharge is reduced.

Focusing on the relationship between the cross-sectional area of the electrode connecting portion 520 and the cross-sectional area of the terminal connecting portion 510, the area S2 of the cross section of the electrode connecting portion 520 orthogonal to the X-axis direction can also be made equal to or more than the area S1 of the cross section of the terminal connecting portion 510 orthogonal to the X-axis direction.

According to this configuration, the resistance value of the electrode connecting portion 520 in the conduction path in the energy storage device 10 is equal to or less than the resistance value of the terminal connecting portion 510. The fusing resistance of the electrode connecting portion 520 is equal to or higher than the fusing resistance of the terminal connecting portion 510. Thereby, for example, the reliability of the energy storage device 10 having improved energy density can be improved.

Figure 7:
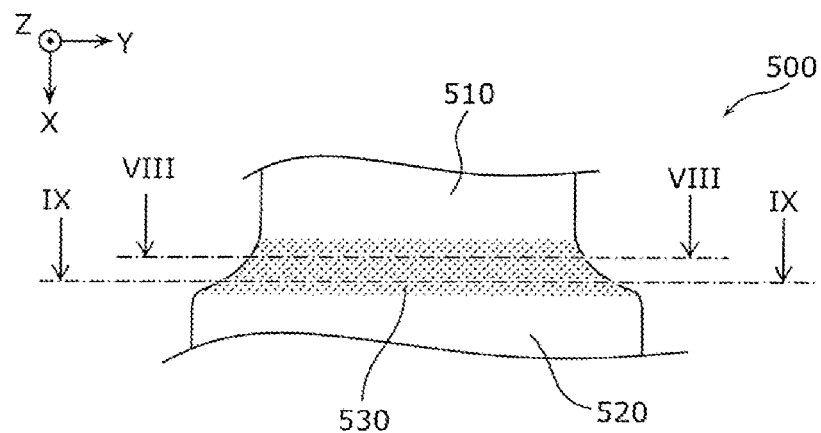
FIG. 7 is a partially enlarged view showing an intermediate portion of the current collector according to the embodiment.
Figure 8:
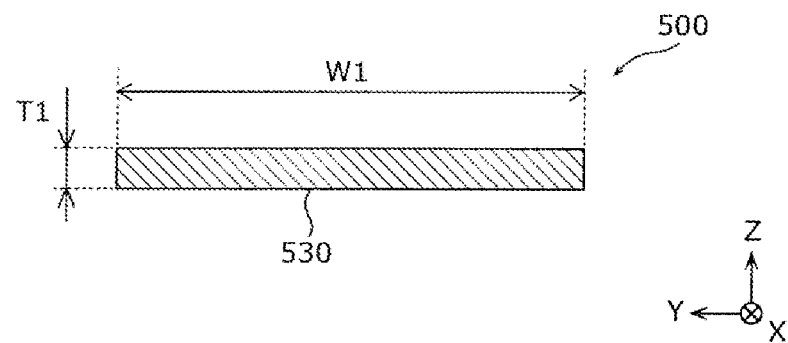
FIG. 8 is a cross-sectional view showing a VIII-VIII cross section of the intermediate portion in FIG. 7.
Figure 9:
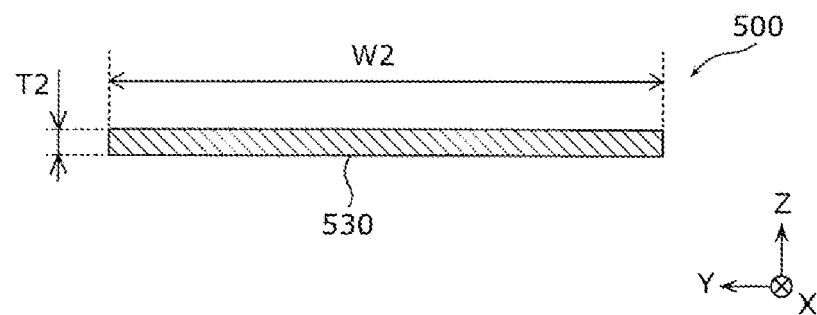
FIG. 9 is a cross-sectional view showing an IX-IX cross section of the intermediate portion in FIG. 7.

The current collector 500 according to the present embodiment has an intermediate portion 530 that gently connects the terminal connecting portion 510 and the electrode connecting portion 520 having different thicknesses and widths. The features of the intermediate portion 530 will be described with reference to FIGS. 7 to 8. FIG. 7 is a partially enlarged view showing the intermediate portion 530 of the current collector 500 according to the embodiment. In FIG. 7, the approximate region of the intermediate portion 530 of the current collector 500 is represented by the region with dots. FIG. 8 is a cross-sectional view showing a VIII-VIII cross section of the intermediate portion 530 in FIG. 7. FIG. 9 is a cross-sectional view showing an IX-IX cross section of the intermediate portion 530 in FIG. 7.

As shown in FIGS. 7 to 9, the current collector 500 according to the present embodiment further has an intermediate portion 530 that connects the terminal connecting portion 510 and the electrode connecting portion 520. The intermediate portion 530 is formed to be smaller in thickness and larger in width in the Y-axis direction as it approaches from the terminal connecting portion 510 to the electrode connecting portion 520.

That is, in the intermediate portion 530, in the VIII-VIII cross section at a position close to the terminal connecting portion 510, it is assumed that the thickness is T1 and the width in the Y-axis direction is W1. In the IX-IX cross section at a position far from the terminal connecting portion 510 (a position close to the electrode connecting portion 520), it is assumed that the thickness is T2 and the width in the Y-axis direction is W2. At this time, T2<T1 and W2>W1. Therefore, for example, it is also possible to make the cross-sectional area (T1×W1) of the VIII-VIII cross section and the cross-sectional area (T2×W2) of the IX-IX cross section substantially the same. Further, it is also possible to make T1×W1 and T2×W2 substantially the same as the cross-sectional area S1 of the terminal connecting portion 510 and the cross-sectional area S2 of the electrode connecting portion 520.

As described above, in the current collector 500 according to the present embodiment, the intermediate portion 530 is provided that changes the cross-sectional shape so that the cross-sectional area becomes substantially constant at the portion where the terminal connecting portion 510 and the electrode connecting portion 520 are connected. As a result, a portion where the cross-sectional area suddenly decreases is not formed at the boundary between the terminal connecting portion 510 and the electrode connecting portion 520.

That is, if the terminal connecting portion 510 having the cross-sectional shape shown in FIG. 5 and the electrode connecting portion 520 having the cross-sectional shape shown in FIG. 6 are directly connected, a small cross-sectional area portion whose cross-sectional area is represented by "L1×D2" is formed at the boundary between the terminal connecting portion 510 and the electrode connecting portion 520. This small cross-sectional area portion becomes a portion having a higher resistance than the others in the conduction path formed in the current collector 500, and becomes a factor of lowering the charge-discharge efficiency of the energy storage device 10. Problems such as fusing may also occur in the small cross-sectional area portion. Therefore, in the current collector 500 according to the present embodiment, an intermediate portion 530 having a shape that suppresses the change in the area of the cross section orthogonal to the X-axis direction is provided between the terminal connecting portion 510 and the electrode connecting portion 520 arranged in the X-axis direction. As a result, the decrease in the charge-discharge efficiency of the energy storage device 10 or the occurrence of fusing or the like in the current collector 500 is suppressed. This contributes to, for example, improving the reliability of the energy storage device 10 having improved energy density.

Since the intermediate portion 530 is a portion between the terminal connecting portion 510 and the electrode connecting portion 520 having different thicknesses from each other, it is a portion forming a step 535 (see FIG. 4) in the side view. This step 535 is directed toward the electrode assembly 700 side.

That is, in the present embodiment, the surface of the current collector 500 facing the lid 120 is flat, and on the surface of the current collector 500 facing the electrode assembly 700, the step 535 due to the difference in thickness between the terminal connecting portion 510 and the electrode connecting portion 520 is formed.

According to this configuration, for example, almost all the space obtained by thinning the electrode connecting portion 520 can be used as a space for housing the electrode assembly 700. That is, the effect of improving the energy density is maximized by making the electrode connecting portion 520 thinner.

Although the energy storage device 10 according to the embodiment has been described above, the energy storage device 10 may include a current collector having a shape different from the shapes shown in FIGS. 2 to 8 as a current collector for connecting the electrode assembly 700 and the electrode terminal 200. Therefore, a modification example of a current collector that the energy storage device 10 includes will be described below with reference to FIG. 10, focusing on the difference from the above embodiment.

First Modification Example

Figure 10:
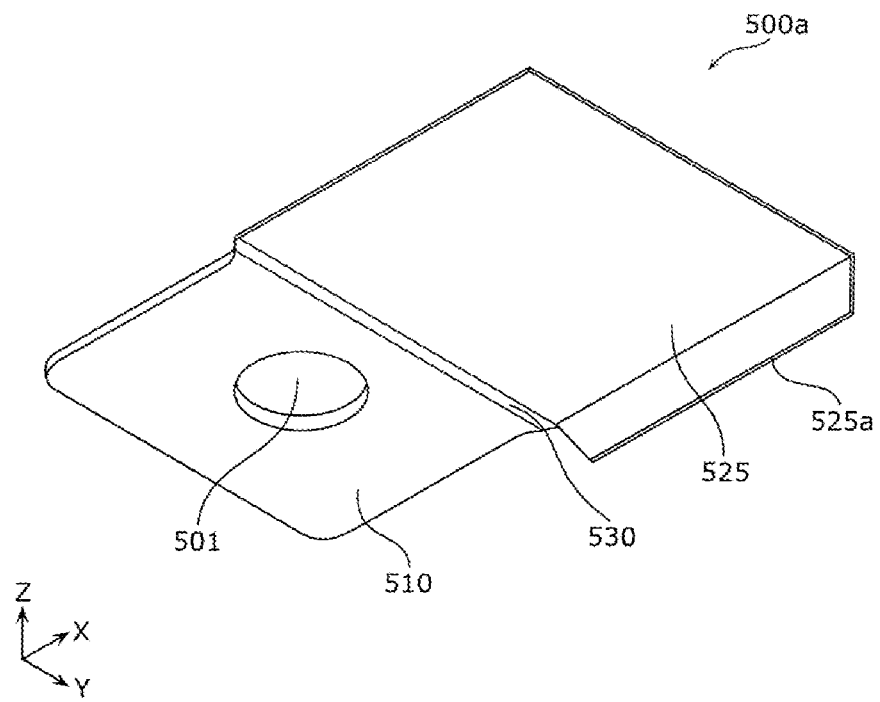
FIG. 10 is a perspective view showing an external appearance of a current collector according to a first modification example of the embodiment.

FIG. 10 is a perspective view showing an external appearance of a current collector 500a according to a first modification example of the embodiment. Specifically, FIG. 10 is a perspective view of the current collector 500a on the positive electrode side when viewed from diagonally below (the side of the electrode assembly 700). The current collector 500a shown in FIG. 10 is a current collector that the energy storage device 10 can include in place of the current collector 500 according to the above embodiment.

The current collector 500a shown in FIG. 10 has a terminal connecting portion 510 connected to the electrode terminal 200 and an electrode connecting portion 525 connected to the electrode assembly 700. The terminal connecting portion 510 and the electrode connecting portion 525 are arranged side by side in the X-axis direction, and the thickness of the electrode connecting portion 525 is smaller than the thickness of the terminal connecting portion 510. These features are common to the current collector 500 according to the above embodiment.

In the current collector 500a according to this modification example, an end portion 525a of the electrode connecting portion 525 in the third direction (Y-axis direction) is bent toward the electrode assembly 700. That is, the electrode connecting portion 525 has the end portion 525a that is bent toward the electrode assembly 700.

According to this configuration, the electrode connecting portion 525 has the bent end portion 525a, thereby suppressing a decrease in the cross-sectional area due to being relatively thin, and allowing a width in the Y-axis direction to have a length nearly equal to that of the terminal connecting portion 510. Therefore, for example, an existing gasket can be used as the lower gasket to be arranged between the current collector 500a and the lid 120. As a result, for example, the manufacturing cost of the energy storage device 10 having improved energy density is suppressed.

In this modification example, in the electrode connecting portion 525, the end portion 525a in the Y-axis plus direction is bent toward the electrode assembly 700. That is, the cross section orthogonal to the conduction direction (X-axis direction) is L-shaped. Therefore, when the electrode connecting portion 525 is joined to the tab portion 720, for example, as can be seen from FIG. 2, the end portion 525a exists closer to the Y-axis plus direction side than the tip of the tab portion 720. That is, the end portion 525a is arranged at a position where the tab portion 720 is not pressed from above. Therefore, since the electrode connecting portion 525 is relatively thin, the effect of improving the energy density can be obtained, and by making the cross section L-shaped, it is possible to secure a cross-sectional area similar to that of the terminal connecting portion 510 in the electrode connecting portion 525. Since the cross section of the electrode connecting portion 525 is L-shaped, the structural strength of the electrode connecting portion 525 is improved.

Second Modification Example

Figure 11:
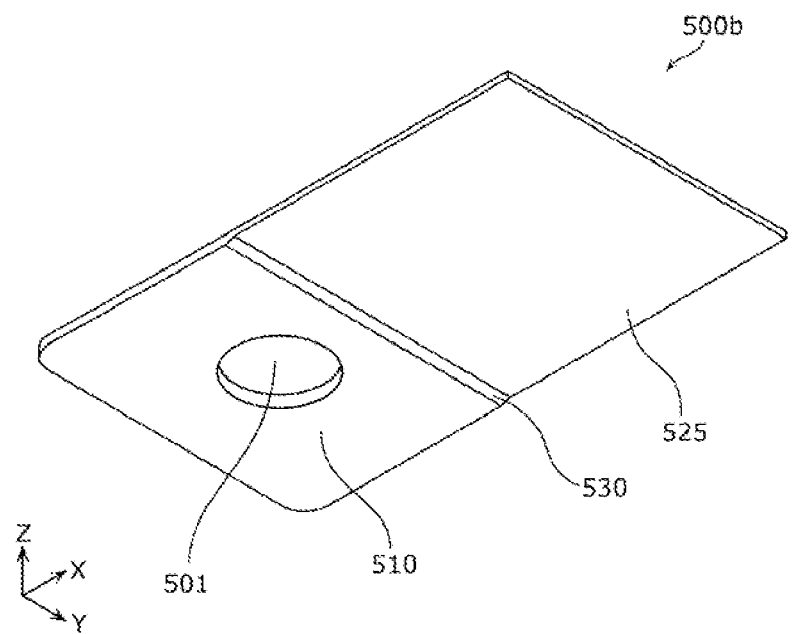
FIG. 11 is a perspective view showing an external appearance of a current collector according to a second modification example of the embodiment.

FIG. 11 is a perspective view showing an external appearance of a current collector 500b according to a second modification example of the embodiment. Specifically, FIG. 11 is a perspective view of the current collector 500b on the positive electrode side when viewed from diagonally below (the side of the electrode assembly 700). The current collector 500b shown in FIG. 11 is a current collector that the energy storage device 10 can include in place of the current collector 500 according to the above embodiment.

The current collector 500b shown in FIG. 11 has a terminal connecting portion 510 connected to the electrode terminal 200 and an electrode connecting portion 526 connected to the electrode assembly 700. The terminal connecting portion 510 and the electrode connecting portion 526 are arranged side by side in the X-axis direction, and the thickness of the electrode connecting portion 526 is smaller than the thickness of the terminal connecting portion 510. These features are common to the current collector 500 according to the above embodiment. In the current collector 500b according to this modification example, the width of the terminal connecting portion 510 in the Y-axis direction and the width of the electrode connecting portion 526 in the Y-axis direction are substantially the same. That is, the electrode connecting portion 526 according to the embodiment according to the present modification example is not formed in a shape clearly wider than the terminal connecting portion 510 like the electrode connecting portion 520 of the current collector 500.

That is, the current collector 500b is formed in a substantially rectangular shape when viewed from the first direction (Z-axis direction). As a result, problems due to the size of the electrode connecting portion 526, for example, since the electrode connecting portion 526 is wide in the Y-axis direction, the current collector 500b cannot be housed within the range of the lower gasket 400, or the distance between the electrode connecting portion 526 and the inner surface of the case 100 is too close, are unlikely to occur. In the current collector 500b, the cross-sectional area of the electrode connecting portion 526 is smaller than the cross-sectional area of the terminal connecting portion 510 in the conduction path along the X-axis direction. However, if the cross-sectional area of the electrode connecting portion 526 is a value that does not substantially hinder the conduction of the energy storage device 10 during the charge-discharge, the cross-sectional area of the terminal connecting portion 510 is equal to or greater than that value. Therefore, even when the energy storage device 10 includes the current collector 500b, the current collector 500b does not deteriorate the performance or reliability of the energy storage device 10. Also in this modification example, since the thickness of the electrode connecting portion 526 is smaller than the thickness of the terminal connecting portion 510, the energy density of the energy storage device 10 can be improved. As described above, if the condition that the terminal connecting portion and the electrode connecting portion are arranged in the second direction and the thickness of the electrode connecting portion is smaller than the thickness of the terminal connecting portion is satisfied, the width of the electrode connecting portion may be less than or equal to the width of the terminal connecting portion.

Other Embodiments

Although the energy storage device according to the embodiment of the present invention and its modification examples has been described above, the present invention is not limited to the above-described embodiment and its modification examples. That is, the embodiment disclosed this time and its modification examples are exemplified in all respects, and the scope of the present invention includes all modifications within the meaning and scope equivalent to the claims.

For example, in the energy storage device 10 according to the embodiment, the current collector 500 having the electrode connecting portion 520 thinner than the terminal connecting portion 510 is provided on both the positive electrode side and the negative electrode side, but it is sufficient that the current collector 500 is arranged on at least one of the positive electrode side and the negative electrode side. For example, when one current collector of the positive electrode side and the negative electrode side can be formed thin, for example, due to the high rigidity of the material of the one current collector, a current collector having a uniform thickness at the terminal connecting portion and the electrode connecting portion may be adopted as the one current collector, and the current collector 500 may be adopted as the other current collector. For example, when the case 100 is electrically connected to one of the positive electrode and the negative electrode of the electrode assembly 700, the current collector 500 may be adopted as a member for connecting the other of the positive electrode and the negative electrode of the electrode assembly 700 to the electrode terminal 200.

The current collector 500 according to the embodiment is arranged on the energy storage device 10 in a posture in which the terminal connecting portion 510 is located outside the first direction (X-axis direction), but may be arranged on the energy storage device 10 in a posture in which the terminal connecting portion 510 is located inside the X-axis direction (on the center side in the X-axis direction of the lid 120). For example, when the electrode terminals 200 on the positive electrode side and the negative electrode side are arranged closer to the center in the longitudinal direction (X-axis direction) of the lid 120, both of the two current collectors 500 in FIG. 2 may be arranged in a posture rotated by 180° around the Z-axis.

In the current collector 500, the electrode connecting portion 520 has portions extending from the terminal connecting portion 510 on both sides in the Y-axis direction, but the electrode connecting portion 520 may have a portion extending from the terminal connecting portion 510 on only one of both sides. That is, a position of the electrode connecting portion 520 in the third direction (Y-axis direction) with respect to the terminal connecting portion 510 in the current collector 500 may be appropriately determined according to, for example, the positional relationship between the electrode terminal 200 and the tab portion 720 or 730 connected to the electrode connecting portion 520.

The type of electrode assembly included in the energy storage device 10 is not limited to the winding type. For example, the energy storage device 10 may include a laminated electrode assembly in which flat plate-shaped electrode plates are laminated, or an electrode assembly having a structure in which long strip-shaped electrode plates are laminated in a bellows shape by repeating mountain folds and valley folds.

Each of the above-mentioned various supplementary items regarding the current collector 500 according to the embodiment may be applied to the current collector 500a according to the modification example. Forms which are constructed by arbitrarily combining the above-mentioned embodiment and the modification examples are also included in the scope of the present invention.

The present invention can be realized not only as such an energy storage device, but also as the current collector included in the energy storage device.

INDUSTRIAL APPLICABILITY

The present invention can be applied to an energy storage device or the like such as a lithium ion secondary battery.

DESCRIPTION OF REFERENCE SIGNS

10: energy storage device
100: case
120: lid
200: electrode terminal
500, 500a: current collector
510: terminal connecting portion
520, 525: electrode connecting portion
525a: end portion
530: intermediate portion
535: step
700: electrode assembly

The invention claimed is:

1. An energy storage device including a case and an electrode assembly housed in the case, the energy storage device comprising:
a current collector arranged between the electrode assembly and a wall of the case in a first direction; and
an electrode terminal fixed to the wall,
wherein the current collector includes:
a terminal connecting portion connected to the electrode terminal; and
an electrode connecting portion connected to the electrode assembly,
wherein the terminal connecting portion and the electrode connecting portion are arranged side by side in a second direction intersecting with the first direction,
wherein a thickness of the electrode connecting portion is smaller than a thickness of the terminal connecting portion,
wherein the electrode assembly includes an electrode assembly body portion and a tab portion protruding from a part of the electrode assembly body portion in the first direction,
wherein the electrode assembly includes a positive electrode plate and a negative electrode plate,
wherein the tab portion is disposed between the electrode assembly body portion and the wall in the first direction,
wherein the tab portion includes a plurality of tabs on the positive electrode plate and a plurality of tabs on the negative electrode plate, and
wherein the plurality of tabs on the positive electrode plate and the plurality of tabs on the negative electrode plate protrude toward the wall.

2. The energy storage device according to claim 1, wherein a width of the electrode connecting portion in a third direction intersecting with the first direction and the second direction is larger than a width of the terminal connecting portion in the third direction.

3. The energy storage device according to claim 2, wherein an area of a cross section of the electrode connecting portion orthogonal to the second direction is equal to or larger than an area of a cross section of the terminal connecting portion orthogonal to the second direction.

4. The energy storage device according to claim 2, wherein the current collector further has an intermediate portion that connects the terminal connecting portion and the electrode connecting portion, and
wherein the intermediate portion is formed to be smaller in thickness and larger in width in the third direction as it approaches from the terminal connecting portion to the electrode connecting portion.

5. The energy storage device according to claim 1, wherein an end portion of the electrode connecting portion in the third direction intersecting with the first direction and the second direction is bent toward the electrode assembly.

6. The energy storage device according to claim 1, wherein a surface of the current collector facing the wall is flat, and
wherein a step is formed on a surface of the current collector facing the electrode assembly due to difference in thickness between the terminal connecting portion and the electrode connecting portion.

7. The energy storage device according to claim 1, wherein the electrode connecting portion is disposed between the electrode assembly and the wall in the first direction.

8. The energy storage device according to claim 1, wherein the current collector, the electrode assembly and the wall are arranged along the first direction.

9. The energy storage device according to claim 1, wherein the tab portion of the electrode assembly extends in a third direction intersecting with the first direction and the second direction.

10. The energy storage device according to claim 1, wherein the electrode assembly includes an oval cross-sectional shape.

11. The energy storage device according to claim 1, wherein the electrode assembly includes an elliptical cross-sectional shape.

12. The energy storage device according to claim 1, wherein a cross-sectional area of the electrode connecting portion is less than a cross-sectional area of the terminal connecting portion.

13. The energy storage device according to claim 1, wherein an area of a cross section of the electrode connecting portion orthogonal to the second direction is made equal to or more than an area of a cross section of the terminal connecting portion orthogonal to the second direction.

14. The energy storage device according to claim 1, wherein the current collector further includes an intermediate portion that connects the terminal connecting portion and the electrode connecting portion that each have different thicknesses and widths.

15. The energy storage device according to claim 14, wherein the intermediate portion has a cross-sectional area that is substantially constant at a portion where the terminal connecting portion and the electrode connecting portion are connected.

* * * * *